(No Model.) 5 Sheets—Sheet 1.
J. F. SWINNERTON, J. G. PEEBLES & E. W. DOUGLAS.
COTTON CONDENSER AND GIN.
No. 539,202. Patented May 14, 1895.
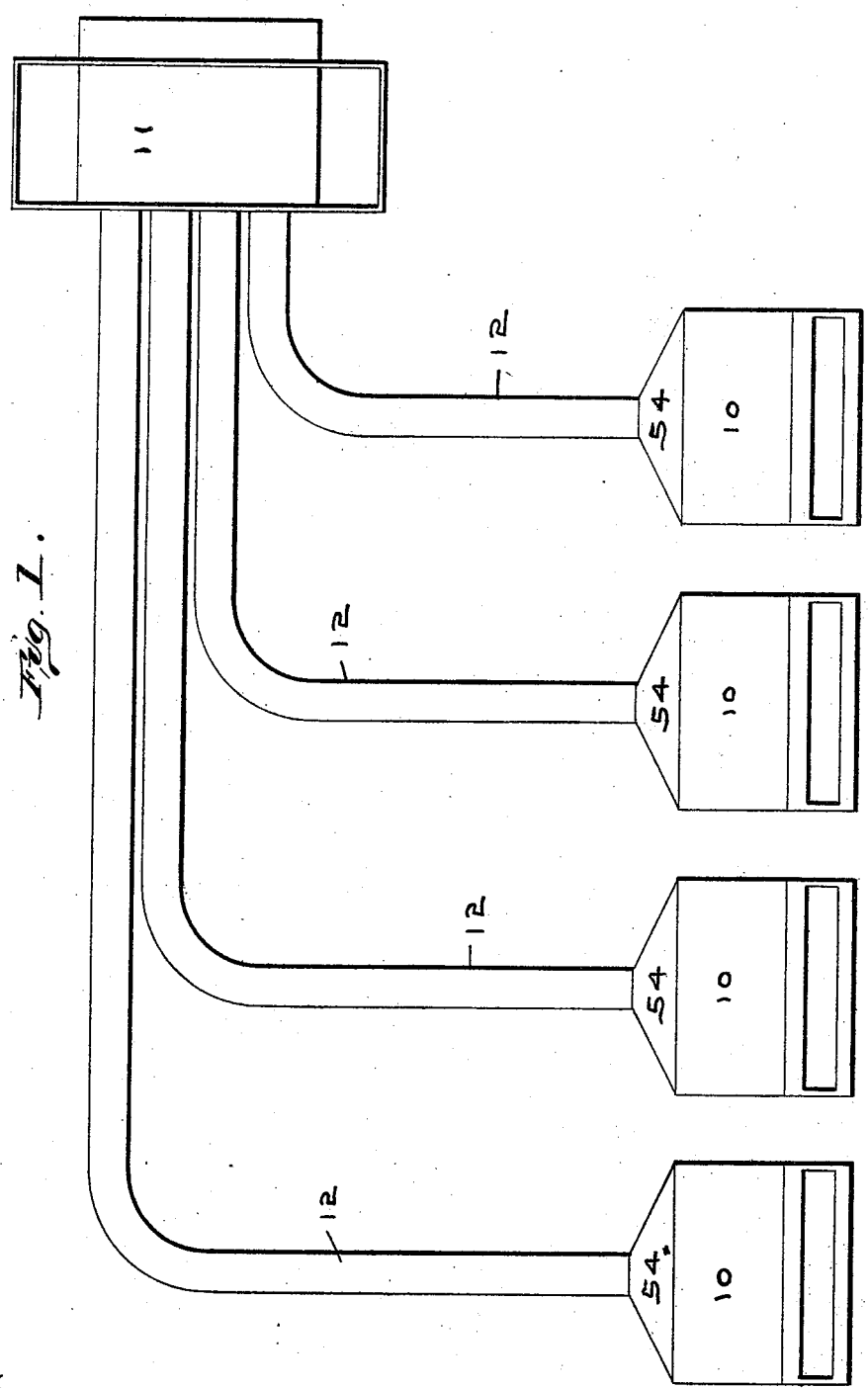

(No Model.) 5 Sheets—Sheet 2.
J. F. SWINNERTON, J. G. PEEBLES & E. W. DOUGLAS.
COTTON CONDENSER AND GIN.
No. 539,202. Patented May 14, 1895.
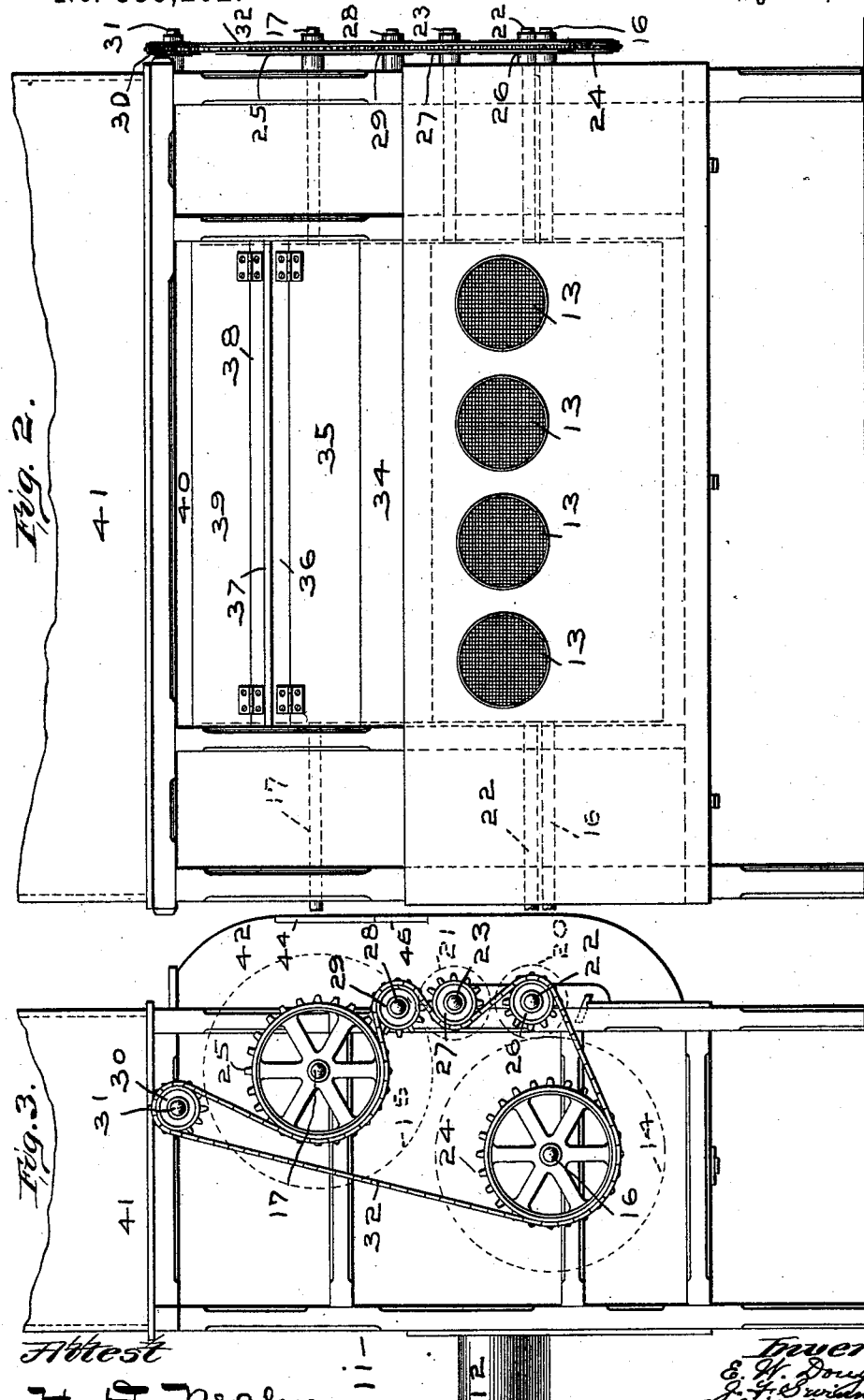

(No Model.) 5 Sheets—Sheet 3.
J. F. SWINNERTON, J. G. PEEBLES & E. W. DOUGLAS.
COTTON CONDENSER AND GIN.
No. 539,202. Patented May 14, 1895.
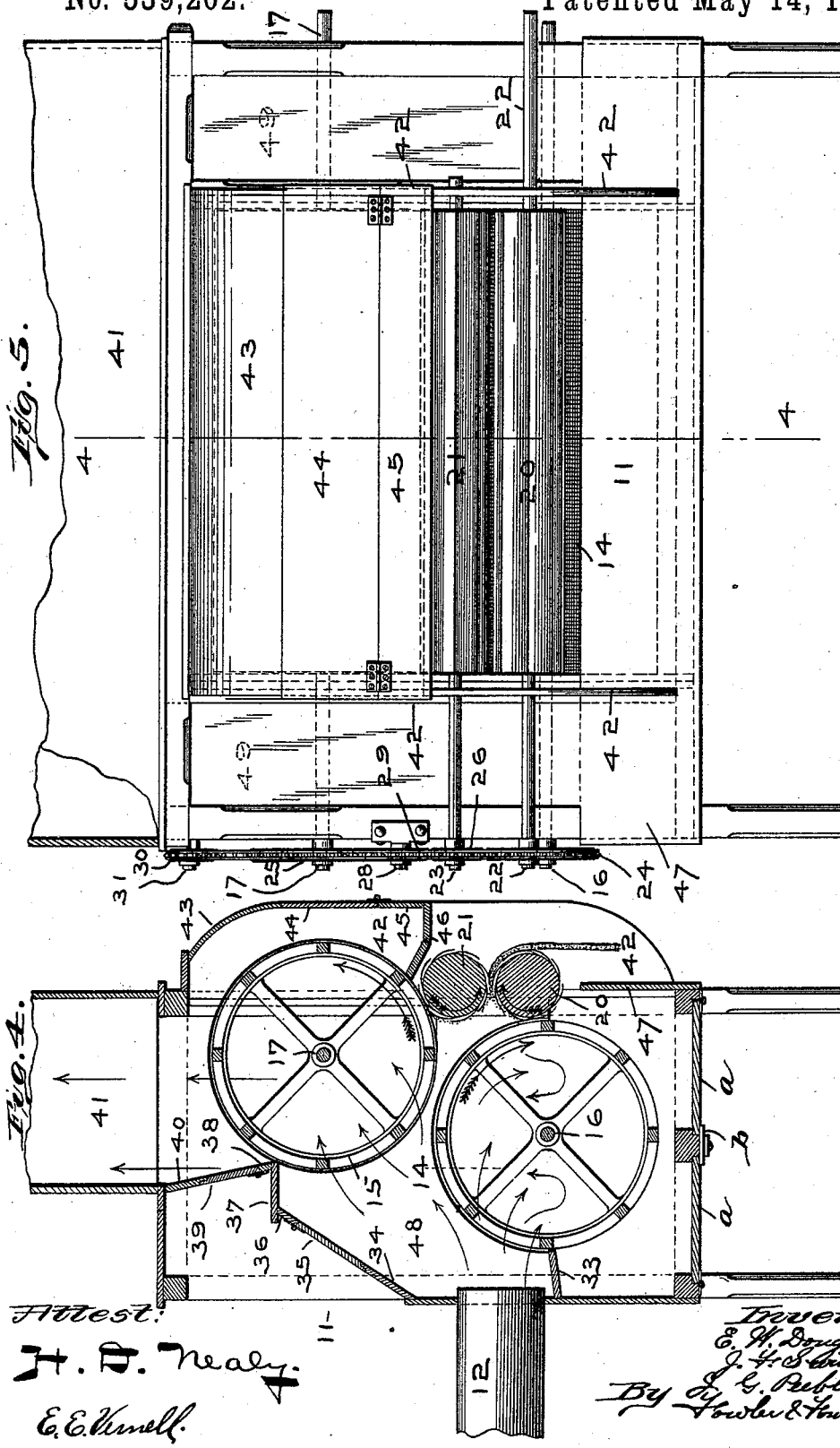

(No Model.) 5 Sheets—Sheet 4.
J. F. SWINNERTON, J. G. PEEBLES & E. W. DOUGLAS.
COTTON CONDENSER AND GIN.
No. 539,202. Patented May 14, 1895.
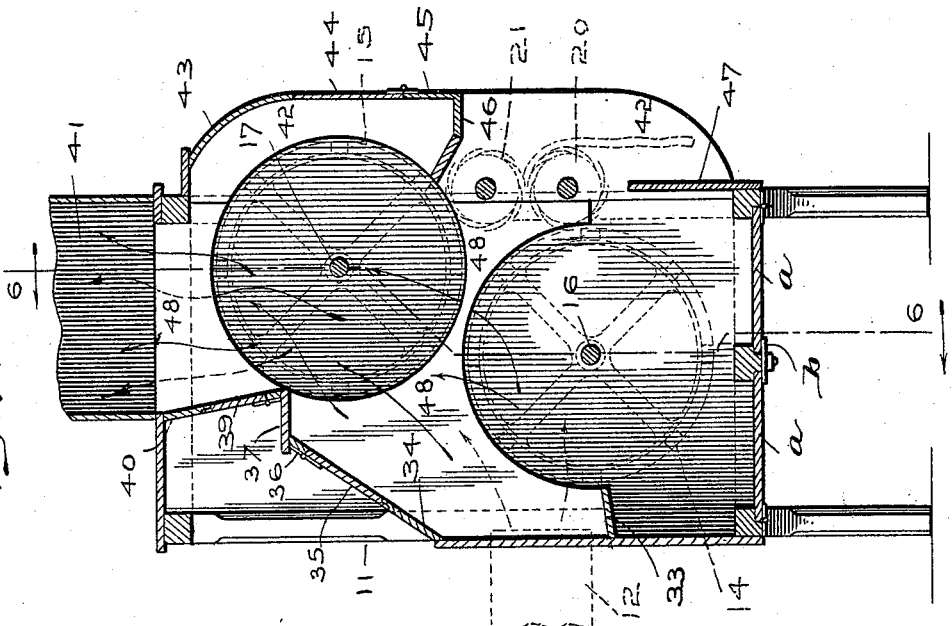
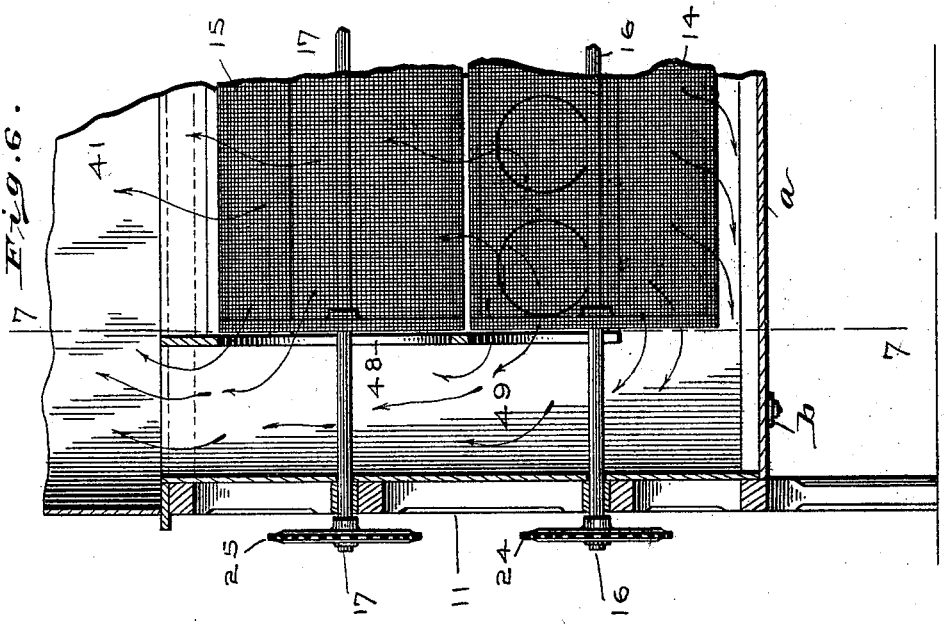
Witnesses
H. S. Nealy
E. E. Vewell
Inventors
E. W. Douglas
J. F. Swinnerton
J. G. Peebles
By Attorneys Fowler & Fowler

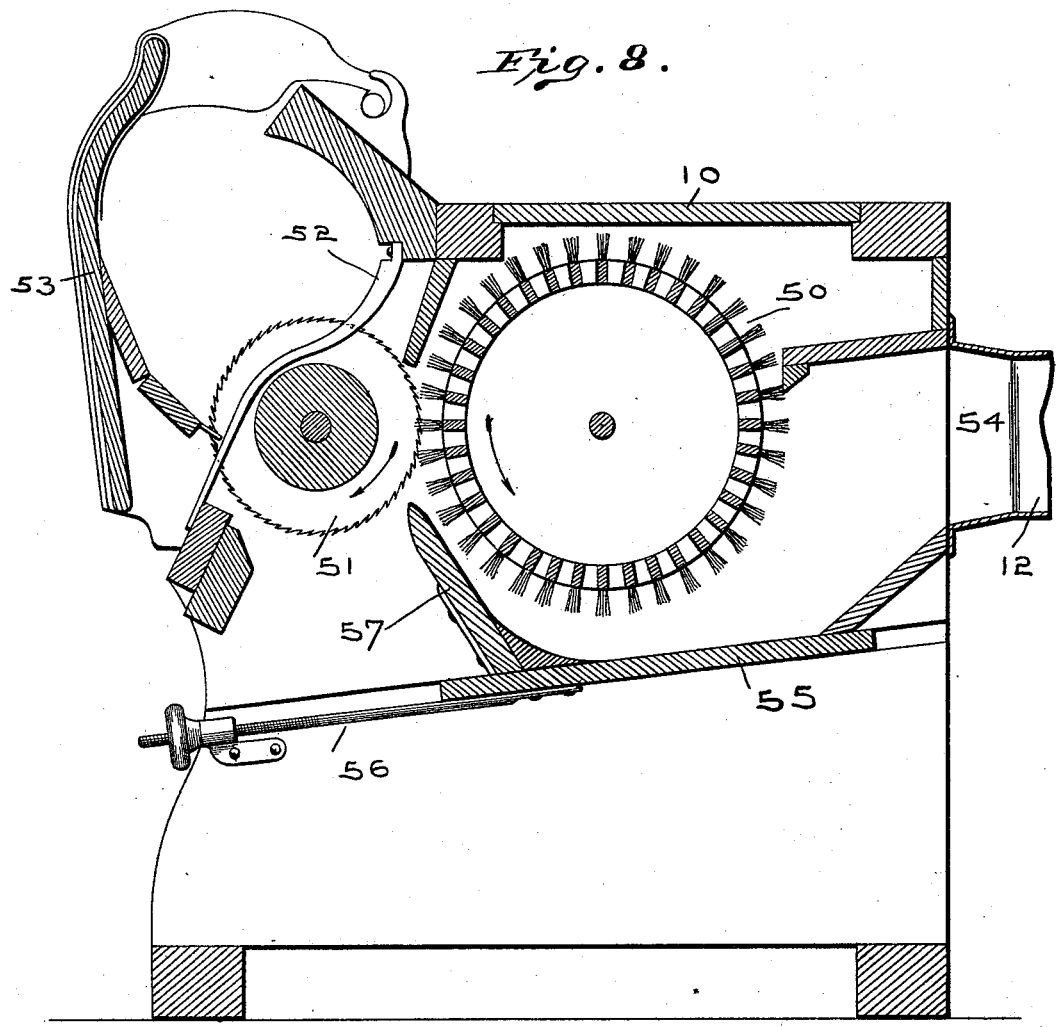

UNITED STATES PATENT OFFICE.

JAMES F. SWINNERTON, JOHN G. PEEBLES, AND ELLIOTT W. DOUGLAS, OF ST. LOUIS, MISSOURI.

COTTON CONDENSER AND GIN.

SPECIFICATION forming part of Letters Patent No. 539,202, dated May 14, 1895.

Application filed March 19, 1894. Serial No. 504,162. (No model.)

*To all whom it may concern:*

Be it known that we, JAMES F. SWINNERTON, JOHN G. PEEBLES, and ELLIOTT W. DOUGLAS, citizens of the United States, residing at St. Louis, State of Missouri, have invented certain new and useful Improvements in Cotton Condensers and Gins, of which the following is such a full, clear, and exact description as will enable any one skilled in the art to which it appertains to make and use the same, reference being had to the accompanying drawings forming part of this specification.

The object of this invention is to provide a ready and effective means for properly condensing and caring for the lint cotton as it comes from two or more gins, and prevent the back pressure of air and the consequent clogging of the lint flues, without employing intermediate valves or other similar devices.

Heretofore cotton gins have been connected each to its own respective condenser, or else the gins have been arranged to discharge their lint cotton into a common flue by which the lint cotton was delivered to the condenser. This necessitates the use of valves or other devices between the gins and flue to prevent back pressure. It has also been proposed to discharge the cotton directly from a series of gins into a common condenser upon a horizontal longitudinally-traveling belt or conveyer therein.

The invention will be best understood by referring to the accompanying drawings illustrating one form thereof.

In the said drawings, Figure 1 is a diagrammatic plan view of a series of gins independently connected by pipes with a condenser common to them all. Fig. 2 is a front elevation of the condenser. Fig. 3 is a side elevation thereof showing the means for propelling the various shafts. Fig. 4 is a view corresponding to Fig. 3, except that it represents a central vertical section of the condenser on the line 4 4 of Fig. 5. Fig. 5 is a rear elevation of the condenser. Fig. 6 is a vertical sectional view of the condenser on the line 6 6 of Fig. 7, and Fig. 7 is a vertical sectional view of the condenser on the line 7 7 of Fig. 6. Fig. 8 is a transverse vertical section of a cotton-gin provided with means for enabling each gin to be connected with a condenser more or less remote therefrom.

The same marks of reference indicate the same parts throughout the several views.

Having now more particular reference to Fig. 1, 10 are a series of gins connected to a condenser 11 by a series of pipes 12, each independently connecting its own gin to the condenser. The condenser in the present instance is shown as arranged at one side of the series of gins, and the pipes 12 have two branches or limbs at right angles to each other, connected by a curved part. It is obvious that the condenser may be arranged in other relations to the gins and the pipes 12 correspondingly shaped to meet the changed requirements.

The cotton gins used with this invention may be the same, generally speaking, as the ordinary saw gin, with the exception of the improvement referred to above, and to be specifically described hereinafter.

In the front of the condenser slightly below the center thereof is a series of circular openings, 13 (Fig. 2) adapted to receive the ends of the pipes 12 remote from the cotton gins. Within the condenser are arranged two revolving cylindrical screens, 14 and 15, each carried by its own shaft 16 and 17 respectively, journaled in bearings upon the outside of the condenser. These revolving screens preferably do not make contact with each other, but are slightly separated, the one 15 being arranged by preference above the other, and slightly to the rear thereof. They are revolved by the means hereinafter described in opposite directions, as shown by the feathered arrows in Fig. 4. Each of these revolving cylindrical screens, 14 and 15, is provided with a wiper roll 20 and 21 respectively. The wiper roll 20 is on a shaft 22, and the wiper roll 21 on a shaft 23, each shaft extending across the rear of the condenser, and supported by bearings at the outside thereof. On the shaft 16 carrying the cylindrical screen 14, is a large sprocket wheel 24 (Fig. 3), and on the shaft 17, carrying the revolving screen 15 is also a large sprocket wheel 25. On the shaft 22 upon which is mounted the wiper roll 20 is a small sprocket wheel 26, and on the shaft 23 upon which is mounted the wiper roll 21 is also a small sprocket wheel 27. Upon a stud 28 extending from the side of the condenser, is arranged a small idler sprocket wheel 29; and near the top of the condenser is also a small idler sprocket wheel 30 journaled upon a stud 31 projecting from the side of the condenser. All these said sprocket wheels are at the same side of the condenser, and arranged in the same plane. Over said sprocket wheels passes a sprocket chain 32, as illustrated more particularly in Fig. 3. Power to revolve the sprocket wheels may be applied to any of the shafts referred to, and the motion thereof communicated to the other sprocket wheels by the sprocket chain 32.

A board or plate 33 is arranged beneath the pipes 12, where they enter the condenser, and extends from the front of the condenser to the revolving cylindrical screen 14, so as to close the condenser below and cause the air to pass through the screen of the revolving cylinder 14. The front of the condenser above the revolving cylinder 14 is preferably drawn inward toward the revolving cylindrical screen 15. This part of the condenser consists first of an inclined board or plate 34, (Figs. 2, 4 and 7,) above which is an inclined door 35, hinged above to a board or plate 36, above which is a horizontal plate or board 37, to which may be secured a plate or board 38, having a hinged door 39. This hinged door 39 may be arranged slightly out of the vertical, and comes against a plate or board 40. The hinged door 35, permits access to be had to the lint space or chamber between the revolving cylinders 14 and 15, and the door 39 enables one to gain access to the condenser above the revolving screen 15. It will be understood, of course, that the space above revolving cylinder 15 is open, so that the air can pass therefrom to a stack or passage-way 41, communicating with the atmosphere.

The rear of the condenser is provided with side extensions 42 (Figs. 3, 4 and 7) which are curved at the top and bottom, and covered above by a curved board or plate 43, below which is a hinged door 44, carried by a board or plate 45, supported by the said side pieces 42. From this board or plate 45 extends between the side extensions 42, an angular board or plate 46, to the revolving cylindrical screen 15. From the lower part of the condenser and rear side thereof, extends upwardly a vertical board or plate 47 to near the wiper roll 20.

Between the sides of the condenser and the revolving cylindrical screens 14 and 15 is placed at each end thereof, a partition or board 48 of substantially the form shown in Fig. 7, the said partition or board having a circular opening cut therein the size of the head of the cylindrical screen cylinder 15 and having a semi-circular part removed therefrom at its lower part adjacent to the cylindrical screen 14. Between the sides of the condenser and the said partitions at each end of the cylindrical screens is left a space 49 forming a flue or passage-way, which communicates with the stack or passage-way 41 previously referred to, leading to the atmosphere. The air which passes through the ends or heads of the cylindrical screen and the circumferential surface thereof is thus afforded an easy unobstructed passage to the atmosphere, as the area of such opening is large. The arrows in Figs. 4, 6, and 7 illustrate the paths of the currents of air through the screen cylinders. Below the revolving screen cylinder 14 is a chamber closed below by hinged doors $a, a$, locked by a turn button $b$. These doors form receptacles for catching the heavy foreign particles in the lint cotton, passing through and around with the revolving screen 14. By turning the button $b$, the doors $a, a$, will swing downward and discharge the material accumulated in the receptacles.

The operation of the apparatus is as follows: The cotton being blown by the drafts of air from the revolving gin brushes through the pipes 12 is deposited on the revolving screens 14 and 15, which rotating in opposite directions toward the wiper rolls, carry the cotton in a bat to the wiper rolls, which in turn revolving in opposite directions, take the bats from their respective screens and form a bat of double thickness, the width of which is equal to the length of the revolving screens and wiper rolls, and to the length of a bale of cotton. The bat after coming from the condenser, is carried in any suitable way to a baling press (not shown) where it is baled.

It will be noted that by the use of two revolving screens the amount of screen surface exposed to the draft of the lint laden air in any given time is double that when but a single revolving screen cylinder is used. By this means the lint cotton is not partially forced through the meshes of the wire of the revolving cylinder by the force of the blast from the gin brushes, as heretofore. The lint cotton is therefore more easily removed from the screen cylinder by the wiper rolls. By this means also a bat of uniform density and thickness of double the ordinary thickness is formed, whereby the baling of the cotton is greatly facilitated. So, too, by the employment of two screen cylinders, the area of the exhaust opening for the escape of air and dust through the cylinders is greatly increased, as in the lower cylinder the ends or circular heads thereof and one-half of the circumferential surface becomes available, while the same or a greater amount of area is available in the upper cylinder, thus insuring at all times a ready means for the dust to escape without creating back pressure in the lint flues leading from the gins, and thus rendering entirely unnecessary intermediate valves or other devices between the gins and the lint flues leading therefrom. It will be further noticed in the arrangement of the screen cylinders as illustrated, that they are so placed in relation to each other, that the maximum amount of dust and dirt is removed from the lint cotton, and what dust and dirt are not carried out into the open air, are so deposited in the condenser as to permit of being easily removed. The construction of this condenser is such that it will admit of its being constructed of sheet metal, so as to render it safer in case of fire. All the bearings of the various shafts are on the outside of the condenser, and fully protected from the dust in the condenser, thereby effectually removing the danger from fire by friction caused by dust in the bearings. The motions of the various parts are communicated to each other by a single link belt, making the movements as positive as if rotated by spur gearing. The lint flues connecting the gins to the condenser are also preferably constructed of sheet metal, and are, by preference, round. These metal tubes are also a preventive against fire.

The advantage of independently connecting each gin with the condenser, and not having the gins deliver the cotton into a flue common to them all leading to the condenser, is, first, as before stated, it obviates the necessity of using a valve intermediate each gin and the lint flue common to the gins, to prevent the back pressure of air in and clogging up of the individual flues, and second, it prevents the formation of counter currents of air, which bunches the lint cotton here and there in the common flue system. By this system also the condenser may be set directly behind and parallel to a line of gins, or it may be set at either end thereof, and at right angles to the line of gins, thus adapting the whole system more fully and completely to the wants of the operator. As counter currents are done away with in this arrangement, the flues are at all times kept clean and free from any deposits of dirt, dust, sand or cotton.

It will be noted in this system that the gins are more or less remote from the condenser, and that the draft of air from each gin is required to deliver its own lint cotton to the condenser independently of the draft of air from other gins. For this reason it is necessary that each gin should have a strong blast of air issuing therefrom in order that the draft of air from each gin may deliver its lint cotton into the condenser, independently of the draft of air from any other gin or gins. To effectuate this purpose, each gin is provided with means for materially increasing the draft of air issuing therefrom. This means is specially required in the present instance in order to make operative the arrangement contemplated by this invention.

Fig. 8 illustrates a cotton gin provided with the means last referred to. 50 is the brush cylinder, 51 the saws, 52 the ribs, and 53 the breast of the gin. Leading from the brushes is a passage-way 54, which connects with one of the pipes or tubes 12. Below the brush cylinder, is the mote board 55, controlled by a suitable rod, 56. An extension, 57, is applied to the front part of the mote board 55, and extends upwardly at about thirty degrees from the vertical to a point near and midway between the saws 51 and the brush cylinder 50. By this means the draft of air created by the revolution of the brush cylinder, is controlled and confined, it being made to pass along the passage-way 54, through the pipe or tube 12 to the condenser, instead of passing downward around the mote board and out the front of the gin. The extension 57 is so placed as to allow a forward and backward movement of the mote board of about two inches to permit regulation of the motes. This extension also cuts off partially the supply of air from under the saws, and causes the air to be drawn between the saws in line with the lint flues and thereby increases the draft of air through the lint flues in this respect also. As the draft of air from each gin by this means is materially increased in the direction of and through the lint flues, it will be evident that the lint cotton will be more effectually delivered to the condenser, and more air will be delivered to the condenser than otherwise, so that the two revolving screens may be used in the condenser, there being lint laden air enough to supply each revolving screen with sufficient lint cotton.

It frequently happens that operators insert their hands beneath the saws and brush cylinder along the mote board to clean off the material which has accumulated thereon, and serious injuries are often caused by the operators getting their hands caught by the revolving brushes and saws. With the above mentioned means the construction is such that the operator cannot gain access to the top of the mote board, and hence does not attempt to clean it off, and thus does not run the risk of injuring himself. Besides with this means the mote board is kept clean and free from deposits of any kind, the draft of air being sufficient to remove all substances therefrom. So, too, when attempts are made to clean off the mote board by hand, the motes and lint cotton removed therefrom are often caught by the revolving saws and thrown violently against the ribs causing them to break and thereby injuring the gin.

Where a great number of gins is employed it may not be desirable to connect all of said gins to a condenser common to them all; in which event the gins may be divided into groups, those of each group being connected to a condenser, common to all of such group. The invention contemplates independently connecting two or more gins to a condenser common to said gins.

Having fully set forth our invention and explained the principle and operation thereof, what we desire to claim and secure by Letters Patent of the United States as our invention is—

1. The combination of a series of cotton gins, a condenser common to said gins pipes or tubes independently connecting each gin to said condenser two revolving screens in said condenser, and a wiper roll for each revolving screen.

2. The combination of a plurality of cotton gins, a condenser common to said gins, pipes independently connecting each gin with said condenser, and a mote-board extension for said cotton gins, reaching from the mote board to a point between the gin saws and brush cylinder, for the purposes set forth.

3. The combination of a series of cotton gins, a condenser common to said gins pipes independently connecting said cotton gins to said condenser, two revolving screens in said condenser, a wiper roll for each revolving screen, and a mote board extension on each gin, reaching upwardly to a point between the gin saws and brush cylinder.

In testimony whereof we have hereunto set our hands and affixed our seals, this 13th day of February, 1894, in the presence of the two subscribing witnesses.

JAMES F. SWINNERTON. [L. S.]
JOHN G. PEEBLES. [L. S.]
ELLIOTT W. DOUGLAS. [L. S.]

Witnesses:
A. C. FOWLER,
STANLEY STONER.